US010908646B2

(12) United States Patent
Kang

(10) Patent No.: US 10,908,646 B2
(45) Date of Patent: Feb. 2, 2021

(54) FLEXIBLE DISPLAY DEVICE

(71) Applicant: Samsung Display Co., Ltd., Yongin-si (KR)

(72) Inventor: Tae Wook Kang, Seongnam-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/210,954

(22) Filed: Dec. 5, 2018

(65) Prior Publication Data
US 2019/0121397 A1 Apr. 25, 2019

Related U.S. Application Data

(63) Continuation of application No. 14/028,646, filed on Sep. 17, 2013, now Pat. No. 10,191,517.

(30) Foreign Application Priority Data

Apr. 11, 2013 (KR) .................. 10-2013-0039866

(51) Int. Cl.
G06F 1/16 (2006.01)
(52) U.S. Cl.
CPC .................. G06F 1/1652 (2013.01)
(58) Field of Classification Search
CPC ......... G06F 1/1652; G06F 2203/04102; H01L 2251/5338; H01L 51/0097; G09G 2380/02; H04M 1/0268; H04M 1/0216; G09F 9/301; G09F 15/0062; G02F 1/133305; G02F 1/13452; G02F 1/167; G02F 1/133308; H05K 1/028; H05K 5/0017
See application file for complete search history.

(56) References Cited

U.S. PATENT DOCUMENTS

| 6,853,293 | B2 | 2/2005 | Swartz et al. |
| 7,755,605 | B2 | 7/2010 | Daniel et al. |
| 8,711,566 | B2* | 4/2014 | O'Brien ............ G06F 1/1624 361/724 |
| 10,194,543 | B2* | 1/2019 | Seo ............... H05K 5/0017 |

(Continued)

FOREIGN PATENT DOCUMENTS

| JP | 2011047977 | 3/2011 |
| JP | 2013003171 | 1/2013 |

(Continued)

OTHER PUBLICATIONS

Non-Final Office Action dated Apr. 10, 2015, in U.S. Appl. No. 14/028,646.

(Continued)

Primary Examiner — Adam B Dravininkas
(74) Attorney, Agent, or Firm — H.C. Park & Associates, PLC

(57) ABSTRACT

A display device includes: a flexible display panel having a display area and a non-display area disposed adjacent to the display area; a supporting member provided at a predetermined area of the flexible display panel adjacent to one side of the flexible display panel, wherein the non-display area of the flexible display panel contacts the supporting member and surrounds the supporting member while being bent at a bend angle, and the bend angle of the non-display area is variously adjusted by the supporting member.

20 Claims, 5 Drawing Sheets

(56) References Cited

U.S. PATENT DOCUMENTS

| | | |
|---|---|---|
| 10,499,493 B2 | 12/2019 | Lee |
| 10,528,084 B2 | 1/2020 | Jin et al. |
| 2002/0070910 A1 | 6/2002 | Fujieda et al. |
| 2003/0160735 A1* | 8/2003 | Lee .................. G06F 3/147 345/4 |
| 2003/0160892 A1* | 8/2003 | Tamura ............. H04N 5/2251 348/333.07 |
| 2004/0052037 A1* | 3/2004 | Sawyer .............. G06F 1/1652 361/679.05 |
| 2004/0061683 A1* | 4/2004 | Mochizuki ......... G06F 1/1601 345/168 |
| 2005/0040962 A1 | 2/2005 | Funkhouser et al. |
| 2005/0110702 A1 | 5/2005 | Aoki et al. |
| 2005/0168491 A1 | 8/2005 | Takahara et al. |
| 2005/0176470 A1 | 8/2005 | Yamakawa |
| 2005/0286008 A1 | 12/2005 | Miyagawa et al. |
| 2006/0209218 A1* | 9/2006 | Lee ..................... G04G 9/00 349/1 |
| 2007/0241002 A1* | 10/2007 | Wu .................... G06F 1/1601 206/150 |
| 2008/0291225 A1 | 11/2008 | Arneson |
| 2008/0303782 A1 | 12/2008 | Grant et al. |
| 2009/0051830 A1* | 2/2009 | Matsushita ......... G06F 1/1647 348/836 |
| 2009/0104931 A1 | 4/2009 | Chiang |
| 2010/0045705 A1 | 2/2010 | Vertegaal et al. |
| 2010/0061070 A1 | 3/2010 | Koh |
| 2010/0117975 A1* | 5/2010 | Cho ................... G06F 1/1626 345/173 |
| 2010/0134873 A1* | 6/2010 | van Lieshout .... G02F 1/133305 359/296 |
| 2010/0144406 A1 | 6/2010 | Ozawa |
| 2010/0177036 A1 | 7/2010 | Nam |
| 2011/0007042 A1* | 1/2011 | Miyaguchi ........ G02F 1/133305 345/204 |
| 2011/0050657 A1* | 3/2011 | Yamada ............. H01L 51/5237 345/204 |
| 2011/0095975 A1 | 4/2011 | Hwang et al. |
| 2011/0176260 A1* | 7/2011 | Walters .............. G06F 1/1641 361/679.01 |
| 2011/0188189 A1 | 8/2011 | Park et al. |
| 2012/0008267 A1* | 1/2012 | Watanabe ........... G06F 1/1652 361/679.01 |
| 2012/0050075 A1* | 3/2012 | Salmon .............. G06F 1/1626 341/20 |
| 2012/0204453 A1* | 8/2012 | Jung ................... G09F 9/301 40/517 |
| 2012/0287066 A1 | 11/2012 | Yang et al. |
| 2012/0314400 A1* | 12/2012 | Bohn .................. G09F 9/301 362/97.1 |
| 2013/0002133 A1* | 1/2013 | Jin .................... H01L 51/524 313/511 |
| 2013/0002572 A1* | 1/2013 | Jin .................... G06F 1/1637 345/173 |
| 2013/0036638 A1 | 2/2013 | Kwack et al. |
| 2013/0044410 A1* | 2/2013 | Verschoor ......... G06F 1/1652 361/679.01 |
| 2013/0058063 A1* | 3/2013 | O'Brien .............. G06F 1/1624 361/807 |
| 2013/0127799 A1* | 5/2013 | Lee .................... G06F 1/1652 345/204 |
| 2014/0002385 A1* | 1/2014 | Ka ..................... G06F 1/1601 345/173 |
| 2014/0217373 A1* | 8/2014 | Youn .................. H01L 23/4985 257/40 |
| 2015/0009636 A1* | 1/2015 | Jeong ................. B65H 18/10 361/749 |
| 2015/0220188 A1* | 8/2015 | Zhao .................. G09G 3/36 345/174 |
| 2016/0187929 A1* | 6/2016 | Kim .................... G06F 1/1652 345/184 |

FOREIGN PATENT DOCUMENTS

| | | |
|---|---|---|
| KR | 10-2011-0088870 | 8/2011 |
| KR | 10-2012-0127038 | 11/2012 |
| KR | 20130004085 | 1/2013 |
| KR | 20130007311 | 1/2013 |
| KR | 20140122597 | 10/2014 |

OTHER PUBLICATIONS

Final Office Action dated Aug. 28, 2015, in U.S. Appl. No. 14/028,646.
Advisory Action dated Nov. 9, 2015, in U.S. Appl. No. 14/028,646.
Non-Final Office Action dated Dec. 31, 2018, in U.S. Appl. No. 14/028,646.
Final Office Action dated Mar. 29, 2016, in U.S. Appl. No. 14/028,646.
Advisory Action dated Jun. 15, 2016, in U.S. Appl. No. 14/028,646.
Non-Final Office Action dated Aug. 11, 2016, in U.S. Appl. No. 14/028,646.
Final Office Action dated Jan. 13, 2017, in U.S. Appl. No. 14/028,646.
Advisory Action dated Apr. 3, 2017, in U.S. Appl. No. 14/028,646.
Non-Final Office Action dated May 5, 2017, in U.S. Appl. No. 14/028,646.
Final Office Action dated Nov. 17, 2017, in U.S. Appl. No. 14/028,646.
Notice of Allowance dated Mar. 7, 2018, in U.S. Appl. No. 14/028,646.
Notice of Allowance dated Sep. 6, 2018, in U.S. Appl. No. 14/028,646.

* cited by examiner

FLEXIBLE DISPLAY DEVICE

CROSS REFERENCE TO RELATED APPLICATION

This application is a Continuation of U.S. patent application Ser. No. 14/028,646, filed on Sep. 17, 2013, which claims priority from and the benefit of Korean Patent Application No. 10-2013-0039866, filed on Apr. 11, 2013, which is hereby incorporated by reference for all purposes as if fully set forth herein.

BACKGROUND OF THE INVENTION

1. Field of the Invention

The present disclosure generally relates to a flexible device having a flexible display panel.

2. Description of the Related Art

In recent years, as the information society has developed rapidly, the technology of display and graphics systems has developed to process and display massive information.

To this end, various flexible display devices having advantages of thin thickness, light weight, and low power consumption, e.g., a liquid crystal display device, a plasma display panel device, a field emission display device, an organic electroluminescent device, an electrophoretic display device, etc., have been widely used to replace a cathode ray tube display device.

The above information disclosed in this Related Art section is only for enhancement of understanding of the background of the invention and therefore it may contain information that does not form the prior art that is already known to a person of ordinary skill in the art.

SUMMARY OF THE INVENTION

The present disclosure provides a flexible device capable of preventing a flexible display panel from being damaged while being bent and maintaining the performance of the flexible display panel.

Embodiments of the inventive concept provide a flexible device including a flexible display panel bent to have a curved surface and a supporting member provided at one end of the flexible display panel. The flexible display panel makes contact with a portion of the supporting member and surrounds the supporting member while being bent.

The flexible display panel includes a display area in which an image may be displayed and a non-display area disposed adjacent to the display panel, and the non-display area may be bent to a rear surface of the flexible display panel, which opposite to a front surface, on which the image may be displayed, of the flexible display panel.

The non-display area includes a first non-display area, a second non-display area spaced apart from the first non-display area to face the first non-display area, a third non-display area disposed adjacent to the first and second non-display areas, and a fourth non-display area disposed adjacent to the first and second non-display areas and spaced apart from the third non-display area to face the third non-display area, and the flexible display panel may be bent in at least one of the first, second, third, or fourth area.

The flexible device further includes a flexible printed circuit board connected to the fourth non-display area.

The flexible display panel may be bent in the fourth non-display area.

According to embodiment, the flexible display panel may be bent in the first non-display area and the second non-display area. In this case, the first non-display area and the second non-display area are bent symmetrical to each other or asymmetrical to each other.

According to embodiment, the flexible display panel may be bent in the third non-display area and the fourth non-display area. In this case, the third non-display area and the fourth non-display area are bent symmetrical to each other or asymmetrical to each other.

The supporting member may be provided at the bent area of the flexible display panel in singular number or the supporting member may be provided in a plural number and the supporting members are disposed to be spaced apart from each other.

The supporting member includes at least one curved surface. The supporting member may be a bar which has a cylindrical shape or an oval cylindrical shape, and the supporting member has a segment of a circle shape in a cross section.

The curved surface of the flexible display panel and the curved surface of the supporting member make contact with each other and have a same curvature.

The supporting member includes a material with plasticity or a material with elasticity.

The flexible device includes an adhesive disposed between the supporting member and the flexible display panel.

According to the above, the curvature of the flexible display panel may be uniformly maintained without the lapse of time, and thus the flexible display panel may be prevented from be deformed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
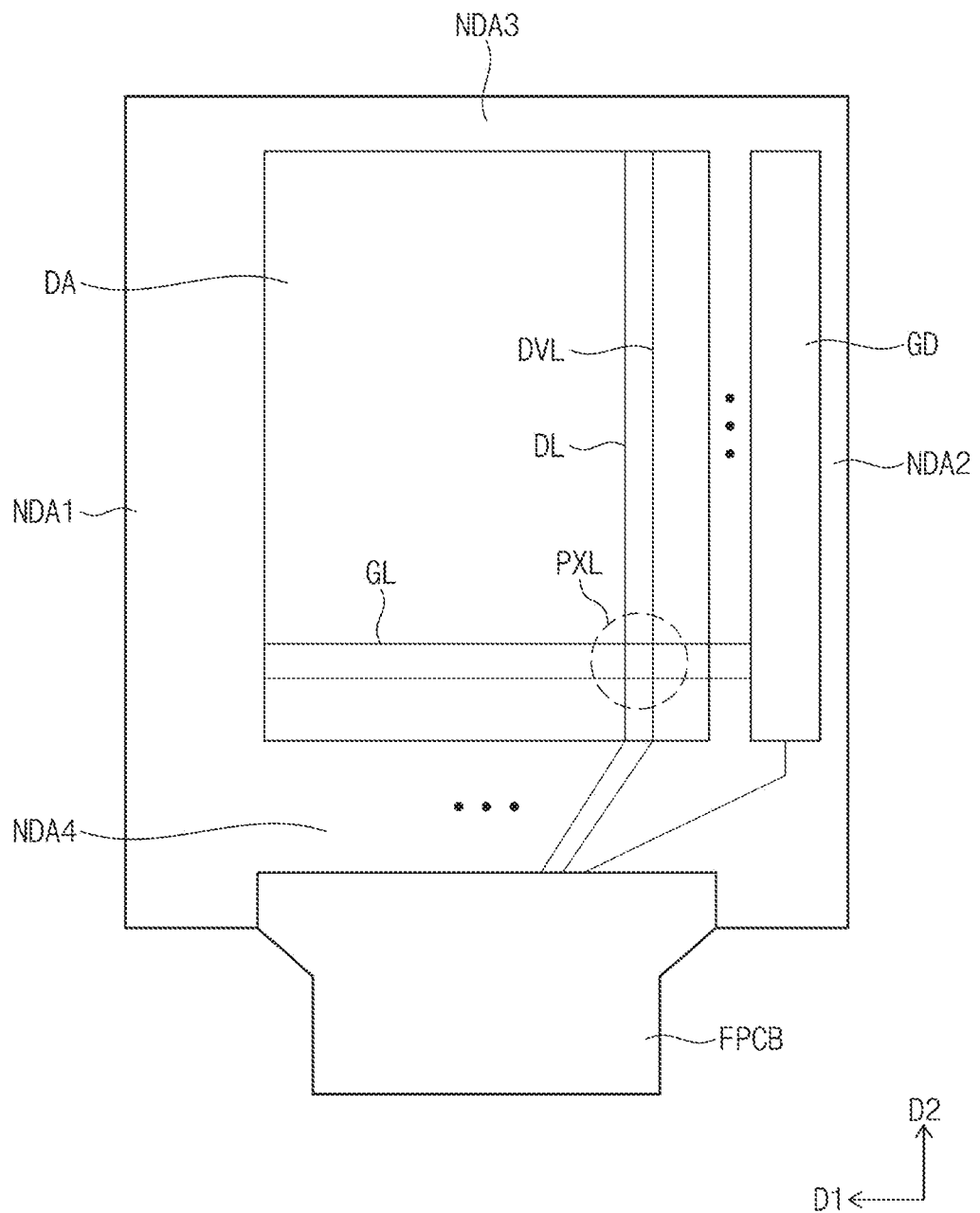
FIG. 1 is a plan view showing a flexible display panel according to an exemplary embodiment of the present disclosure.

It will be understood that when an element or layer is referred to as being "on", "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Flexible display device, which may be made of a flexible plastic, has been actively researched since the flexible display device maintains its display performance even though the flexible display device is bent. The flexible display device has been spotlighted as a next generation display device to be used for a portable computer, an electronic newspaper, a smart card, and a printed media, such as a book, a newspaper, a magazine, etc.

Hereinafter, the present invention will be explained in detail with reference to the accompanying drawings.

Figure 2:
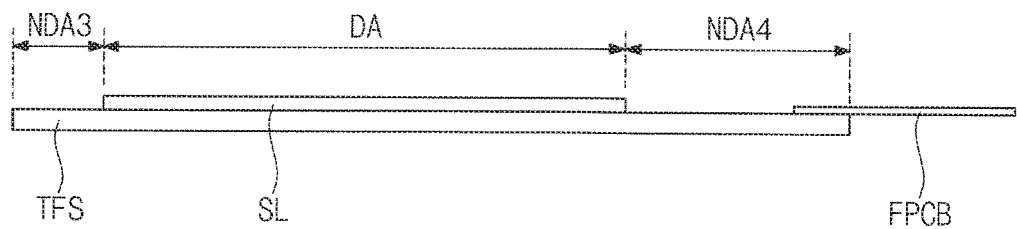
FIG. 2 is a cross-sectional view showing the flexible display panel when the flexible display panel is not bent after a supporter is omitted.
Figure 3:
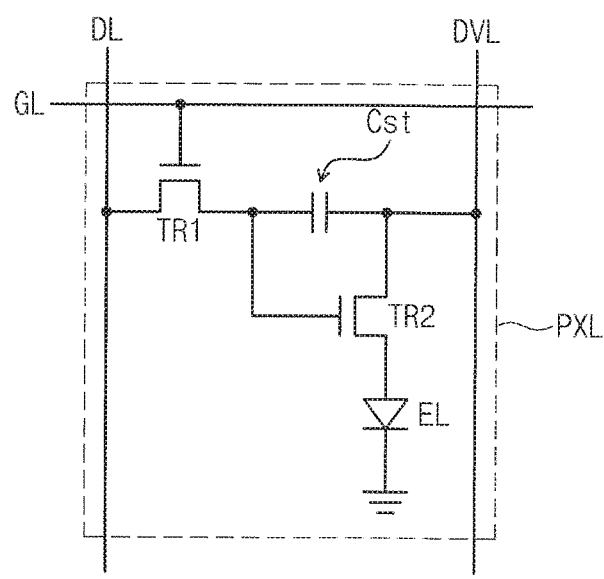
FIG. 3 is an equivalent circuit diagram showing a pixel area shown in FIG. 1.
Figure 4:
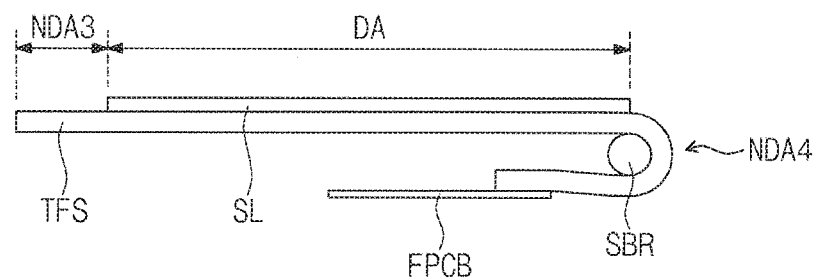
FIG. 4 is a cross-sectional view showing a flexible display panel according to an exemplary embodiment of the present disclosure.

FIG. 1 is a plan view showing a flexible display panel according to an exemplary embodiment of the present disclosure, FIG. 2 is a cross-sectional view showing the flexible display panel when the flexible display panel is not bent after a supporting member is omitted, FIG. 3A is an equivalent circuit diagram showing a pixel area shown in FIG. 1, and FIG. 4 is a cross-sectional view showing a flexible display panel according to an exemplary embodiment of the present disclosure. In the present exemplary embodiment, a direction of the flexible display panel, in which an image is displayed, is referred to as a front surface direction and an opposite direction of the flexible display panel is referred to as a rear surface direction, but the front and rear surface directions should not be limited thereto or thereby.

Referring to FIGS. 1 to 4, the flexible device includes a flexible display panel and a driver connected to or built in the flexible display panel. In addition, the flexible device further includes a housing (not shown) to accommodate the flexible display panel and a window member (not shown) disposed on the front surface of the flexible display panel to protect the flexible display panel.

In a case that the flexible device is a liquid crystal display device, the flexible display panel includes a thin film transistor substrate, a color filter substrate facing the thin film transistor while being coupled to the color filter substrate, and a liquid crystal layer interposed between the thin film transistor substrate and the color filter substrate.

When the flexible device is an organic electroluminescent light emitting display, the flexible display panel includes a thin film transistor substrate TFS, an organic light emitting device EL disposed on the thin film transistor substrate TFS, and a sealing layer SL that covers the thin film transistor substrate TFS.

The flexible device may be, but not limited to, an electrophoretic display device.

In the following description, the flexible display device will be described as the flexible device, but the flexible device should not be limited to the flexible display device. That is, the flexible device may be a flexible photovoltaic cell.

Referring to FIG. 1, the flexible display panel includes a display area DA in which the image is displayed DA, a first non-display area NDA1, a second non-display area NDA2, a third non-display area NDA3, and a fourth non-display area NDA4, which are disposed adjacent to the display area DA. The first non-display area NDA1 and the second non-display area NDA2 are spaced apart from each other to face each other when viewed in a plan view. In addition, the third non-display area NDA3 and the fourth non-display area NDA4 are adjacent to the first and second non-display areas NDA3 and NDA4 and spaced apart from each other to face each other when viewed in a plan view.

The driver includes a gate driver GD, a data driver (not shown), and a main driver (not shown), which are disposed in or connected to the first to fourth non-display areas NDA1 to NDA4.

Referring to FIGS. 1 to 3, the display area DA includes a line part and a plurality of pixels PXL connected to the line part to display the image.

The line part includes a gate line GL, a data line DL, and a driving voltage line DVL.

Each pixel PXL includes a thin film transistor connected to the line part, the organic light emitting device EL connected to the thin film transistor, and a capacitor Cst.

The gate line GL may be extended in a first direction D1. The data line DL may be extended in a second direction D2 different from the first direction D1. The driving voltage line DVL may be extended in the same direction as the data line DL. In this case, the first direction D1 and the second direction D2 cross each other.

The gate line GL applies a scan signal to the thin film transistor, the data line DL applies a data signal to the thin film transistor, and the driving voltage line DVL applies a driving voltage to the thin film transistor.

The pixels PXL are arranged in a matrix form. Here, each pixel PXL has a rectangular shape, but it should not be limited to the rectangular shape. In addition, the pixels PXL have different areas from each other. For instance, when the pixels PXL displays different colors, the pixels PXL may have different areas or different shapes according to the colors.

The thin film transistor includes a driving thin film transistor TR2 to control the organic light emitting device EL and a switching thin film transistor TR1 to switch the driving thin film transistor TR2. In the present exemplary embodiment, each pixel PXL includes two thin film transistors TR1 and TR2, but the number of the thin film transistors should not be limited to two. That is, each pixel PXL may include one thin film transistor and the capacitor Cst or three or more thin film transistors and two or more capacitor Cst.

Each of the switching thin film transistor TR1 and the driving thin film transistor TR2 includes a gate electrode (not shown), a source/drain electrode (not shown) and a semiconductor layer (not shown), and these are insulated from or connected to each other. The gate electrode of the switching thin film transistor TR1 may be different from the gate electrode of the driving thin film transistor TR2, the source/drain electrode of the switching thin film transistor TR1 may be different from the source/drain electrode of the driving thin film transistor TR2, and the semiconductor layer of the switching thin film transistor TR1 may be different from the semiconductor layer of the driving thin film transistor TR2.

The semiconductor layer may be disposed on the gate electrode to be insulated from the gate electrode and a portion of the semiconductor layer may be overlapped with the gate electrode. In the present exemplary embodiment, the semiconductor layer includes a semiconductor material, and the semiconductor material includes amorphous silicon or crystalline silicon, but the semiconductor material should not be limited thereto or thereby. According to embodiment, the semiconductor layer may include oxide semiconductor, such as ZnO, $SnO_2$, $In_2O_3$, $Zn_2SnO_4$, $Ge_2O_3$, and $HfO_2$, or the semiconductor layer AP may include compound semiconductor, such as GsAs, GaP, and InP.

The switching thin film transistor TR1 may be connected to the gate line GL, the data line DL, and the driving thin film transistor TR2. Accordingly, the switching thin film transistor TR1 applies the data signal provided through the data line DL to the driving thin film transistor TR2 in response to the gate line GL.

The driving thin film transistor TR2 may be connected to the switching thin film transistor TR1, the driving voltage line DVL, and the organic light emitting device EL.

The organic light emitting device EL includes a light emitting layer (not shown), a pixel electrode (not shown), a common electrode (not shown) facing the pixel electrode while interposing the light emitting layer therebetween. The common electrode may be applied with a common voltage and the light emitting layer emits a light in response to an output signal of the driving thin film transistor TR2, thereby displaying a desired image.

The light emitting layer may include fluorescent materials to emit red, green, and blue colors to respectively correspond to the pixels PXL. In this case, the pixels that emit the red, green, and blue colors may be referred to as red, green, and blue color pixels respectively corresponding to a red pixel area, a green pixel area, and a blue pixel area. One red pixel, one green pixel, and one blue pixel form one main pixel, but the color of the light exiting from each pixel PXL, i.e., a wavelength of the light, should not be limited thereto or thereby. That is, each pixel PXL may further emit a yellow light or a magenta light, or one pixel PXL may emit a white light.

One of the pixel electrode and the common electrode may be an anode and the other one of the pixel electrode and the common electrode may be a cathode.

The capacitor Cst may be connected to the driving thin film transistor TR2 and charged with the data signal applied to the driving thin film transistor TR2.

The gate driver GD and a gate pad (not shown) extended from the gate line GL and electrically connected to the gate driver GD are disposed in the second non-display area NDA2. The gate driver GD may be mounted on the second non-display area NDA2 or provided after being connected to an additional flexible printed circuit board FPCB.

The gate pad applies the scan signal to the gate line GL, which may be applied to the gate driver GD from the main driver.

A data pad (not shown) extended from the data line DL may be disposed in the fourth non-display area NDA4. In addition, the data driver connected to the data pad may be disposed in the fourth non-display area NDA4.

The data pad applies the data signal to the data line DL, which may be applied to the data driver from the main driver.

In addition, the driving voltage line DVL may be connected to the main driver and the driving voltage may be applied to the driving voltage line DVL from the main driver.

The data driver may be mounted on the fourth non-display area NDA4 by a chip on glass (COG) method. In this case, the main driver may be disposed on the flexible printed circuit board FPCB connected to the data driver. For instance, the main driver may be connected to an end portion of the data driver. The flexible printed circuit board FPCB includes a flexible printed circuit FPC and a multi-layer printed circuit board (PCB).

The data driver may be connected to the fourth non-display area NDA4 by using a tape-automated bonding (TAB) method. In this case, the data driver and the main driver are disposed on the flexible printed circuit board FPCB electrically connected to the data pad in the fourth non-display area NDA4. For instance, the flexible printed circuit board FPCB includes a tape carrier package (TCP) on which the data driver may be mounted and a multi-layer printed circuit board connected to the tape carrier package, on which the main driver may be mounted.

The main driver and the data driver are electrically connected to each other through fine lines formed on the flexible printed circuit board FPCB.

Additionally, the driver may further include an external power source input unit connected to the main driver. The external power source input unit receives an external power source and an image signal.

The positions of the gate driver, the data driver, and the main driver should not be limited to the second and fourth non-display areas NDA2 and NDA4. That is, the gate driver, the data driver, and the main driver may be variously disposed in the first to fourth non-display areas NDA1 to NDA4.

The sealing layer SL may be disposed on the common electrode to cover only the display area DA, the display area DA and a portion of the non-display area, or the display area DA and the non-display area.

The sealing layer SL prevents moisture or air from infiltrating into the light emitting layer disposed on the display area DA, thereby preventing the light emitting layer from being deteriorated. A protective layer formed of at least one of an organic material or an inorganic material may be provided between the common electrode and the sealing layer SL. The protective layer may be formed of a material cured by heat or light, and thus the flexible display panel and the sealing layer SL may be easily attached to each other.

Referring to FIG. 4, the fourth non-display area NDA4 may be bent to the rear surface direction to slim the flexible display device and minimize the exposure the non-display area when viewed in a plan view.

In this case, the flexible display panel may be bent to have a curved surface and a supporting member SBR may be provided at one end of the bent area of the flexible display panel. In the present exemplary embodiment, a shape of the supporting member may be a bar. The flexible display panel may be bent and surrounds the supporting member SBR to make contact with a portion of the supporting member SBR. The flexible display panel may be bent at an angle of about 90 degrees or more. When viewed in the front surface direction, the area of the fourth non-display area NDA4 of the flexible display panel becomes smaller than the area of the fourth non-display area NDA before the flexible display panel may be bent.

The supporting member SBR includes at least one curved surface. For instance, the supporting member SBR has one closed surface, e.g., a cylindrical shape or an oval cylinder shape, when viewed in a cross section. In addition, the supporting member SBR may include one curved surface and at least one flat surface, and has a segment of a circle shape or a sector shape in a view taken along a direction substantially vertical to a longitudinal direction of the supporting member SBR.

When the supporting member SBR has the cylindrical shape or the oval cylinder shape, an end portion of the bent area of the flexible display panel forms an angle equal to or greater than about 0 degree and smaller than about 45 degrees with respect to the display area DA. When the angle is 0 degrees, the flexible printed circuit board FPCB connected to the end portion of the fourth non-display area NDA4 may be disposed to be substantially in parallel to the display area DA.

When the cross section of the supporting member SBR has the segment of circle shape or the sector shape in the view taken along the direction substantially vertical to the longitudinal direction of the supporting member SBR, the end portion of the bent area of the flexible display panel forms an angle equal to or greater than about 45 degrees and equal to or smaller than about 90 degrees with respect to the display area DA. When the angle is 90 degrees, the flexible printed circuit board FPCB connected to the end portion of the fourth non-display area NDA4 may be disposed to be substantially vertical to the display area DA.

As described above, the bent angle and the bent shape of the supporting member SBR are varied depending on the shape of the supporting member SBR. Thus, when the shape of the supporting member SBR may be changed, the bent angle of the flexible display panel may be variously adjusted.

The supporting member SBR has a uniform curvature in the area in which the supporting member SBR makes contact with the flexible display panel along the longitudinal direction of the supporting member SBR. However, the surface of the supporting member SBR, which does not make contact with the flexible display panel, may have various shapes. As an example, the surface of the supporting member SBR, which does not make contact with the flexible display panel, may have a wave shape or a sawtooth shape. In addition, both ends of the surface of the supporting member SBR, which does not make contact with the flexible display panel, have different heights.

The supporting member SBR has a length equal to or smaller than the flexible display panel. The supporting member SBR may be provided in singular number, but it should not be limited thereto or thereby. That is, plural supporting members may be disposed to be spaced apart from each other while making contact with the bent area of the flexible display panel. In this case, the supporting members have different shapes or the same shape, however curved surfaces of the supporting members, which make contact with the flexible display panel, have the same curvature.

An adhesive may be further provided between the supporting member SBR and the flexible display panel. The adhesive may be, but not limited to, an optically clear adhesive (OCA). Due to the adhesive, the supporting member SBR and the flexible display panel may be securely adhered to each other.

A portion of the supporting member SBR, which may be overlapped with the display area DA, may be transparent in order to allow the light traveling to the display area DA to transmit through the supporting member SBR.

The supporting member SBR may include a material having no elasticity, e.g., plastic, metal, wood, etc. In this case, the supporting member SBR securely maintains the bent state of the flexible display panel.

The supporting member SBR may include a material having elasticity, e.g., rubber, silicon resin, etc. In this case, the supporting member SBR absorbs external impacts applied to the bent area of the flexible display panel, and thus the flexible display panel endures the external impacts much better than that when the supporting member SBR includes the material having no elasticity.

When the flexible device is manufactured according to the above-mentioned structure, the curvature of the flexible display panel may be uniformly maintained. When the flexible display panel does not include the supporting member SBR, the curvature of the flexible display panel may be not maintained. As a result, the shape of the bent area and the curvature of the flexible display panel are changed, a crack occurs in the area in which the circuits of the flexible display panel are formed, and the flexible display panel is malfunctioned.

According to the present exemplary embodiment, since the flexible display panel includes the supporting member SBR, the shape of the bent area of the flexible display panel may be maintained and the flexible display panel may be prevented from being bent in unwanted areas. In addition, when the thickness and the elasticity of the supporting member SBR are adjusted, a neutral surface (not shown) in which a vector sum of tensile force and compressive force applied to the flexible display panel, which may be bent, becomes zero may be placed on the thin film transistor substrate TFS of the flexible display panel. Thus, the circuits and the inorganic layer of the flexible display panel may be prevented from being cracked.

Figure 5A:
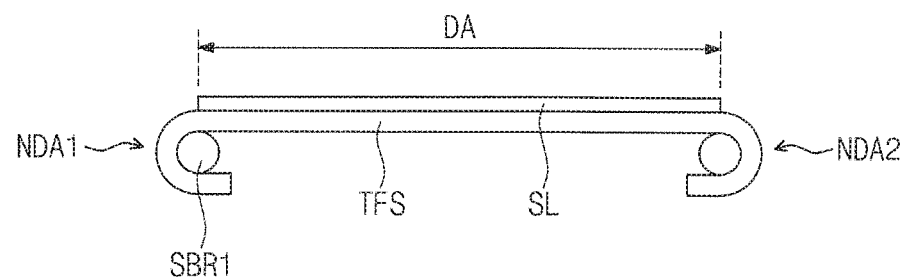
FIGS. 5A to 5C are cross-sectional views showing a flexible display panel according to an exemplary embodiment of the present disclosure.
Figure 5B:
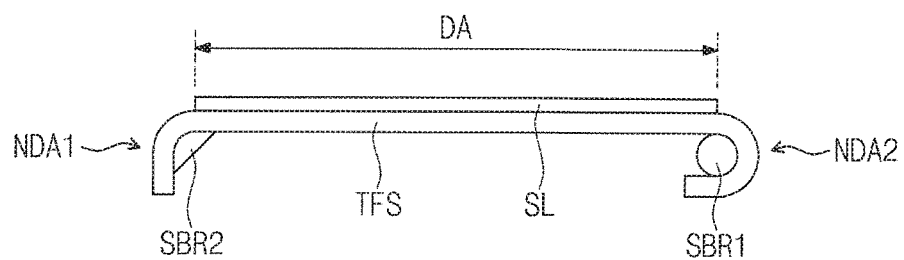
Figure 5C:
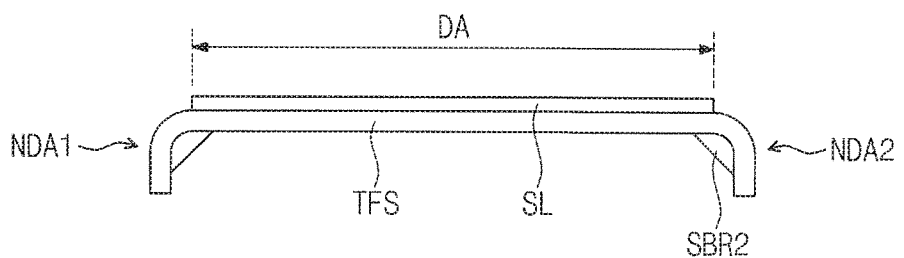

FIGS. 5A to 5C are cross-sectional views showing a flexible display panel according to an exemplary embodiment of the present disclosure. In FIGS. 5A to 5C, the same reference numerals denote the same elements in FIGS. 1 to 4, and thus detailed descriptions of the same elements will be omitted.

Referring to FIGS. 5A to 5C, the first non-display area NDA1 and the second non-display area NDA2 of the flexible display panel are bent. Therefore, at least two supporting members, e.g., two first supporting members SBR1, are included in the flexible display panel and respectively disposed at one end of the first non-display area NDA1 and one end of the second non-display area NDA2.

The first supporting members SBR1 have a cylindrical shape with the same radius as or different radius from that of the supporting member SBR, but the shape of the first supporting members SBR1 should not be limited to the cylindrical shape.

Referring to FIG. 5B, a first supporting member SBR1 and a second supporting member SBR2, which have different shapes from each other, may be respectively disposed at the one end of the first non-display area NDA1 and the one end of the second non-display area NDA2. Accordingly, the first non-display area NDA1 and the second non-display area NDA2 are bent asymmetrical to each other. For instance, when the flexible display panel may be bent in the second non-display area NDA2 to surround the first supporting member SBR1, the second non-display area NDA2 of the flexible display panel forms an angle of about 0 degrees with respect to the display area DA, and when the flexible display panel may be bent in the first non-display area NDA1 to surround the second supporting member SBR2, the first non-display area NDA1 of the flexible display panel forms an angle of about 90 degrees with respect to the display area DA.

In this case, the first supporting member SBR1 and the second supporting member SBR2 have the same elasticity or different elasticity.

Referring to FIGS. 5A and 5C, two first supporting members SBR1 or two second supporting members SBR2 may be respectively disposed in the first non-display area NDA1 and the second non-display area NDA2. Therefore, the first non-display area NDA1 and the second non-display area NDA2 may be bent symmetrical to each other. In this case, the first non-display area NDA1 and the second non-display area NDA2 are bent at an angle of about 90 degrees.

In the case that the first supporting member SBR1 and the second supporting member SBR2 are formed of the material with no elasticity, the first and supporting members SBR1 and SBR2 may securely maintain the bent state of the flexible display panel.

When the supporting member SRB1 and the second supporting member SBR2 are formed of the material with elasticity, the first and second supporting members SBR1 and SBR2 absorb external impacts applied to the bent area of the flexible display panel, and thus the flexible display panel endures the external impacts much better than that when the first and second supporting members SBR1 and SBR2 include the material having no elasticity.

When the flexible device is manufactured according to the above-mentioned structure, the curvature of the flexible display panel may be uniformly maintained. When the flexible display panel does not include the first supporting member SBR1 or the second supporting member SBR2, the curvature of the flexible display panel may be not maintained. As a result, the shape of the bent area and the curvature of the flexible display panel are changed, a crack occurs in the area in which the circuits of the flexible display panel are formed, and the flexible display panel is malfunctioned.

According to the present exemplary embodiment, since the flexible display panel includes the first and second supporting members SBR1 and SBR2, the shape of the bent area of the flexible display panel may be maintained and the flexible display panel may be prevented from being bent in unwanted areas.

In addition, when the thickness and the elasticity of the first and second supporting members SBR1 and SBR2 are adjusted, the neutral surface (not shown) in which the vector sum of the tensile force and the compressive force applied to the flexible display panel, which may be bent, becomes zero may be placed on the thin film transistor substrate TFS of the flexible display panel. Thus, the circuits and the inorganic layer of the flexible display panel may be prevented from being cracked.

Figure 6A:
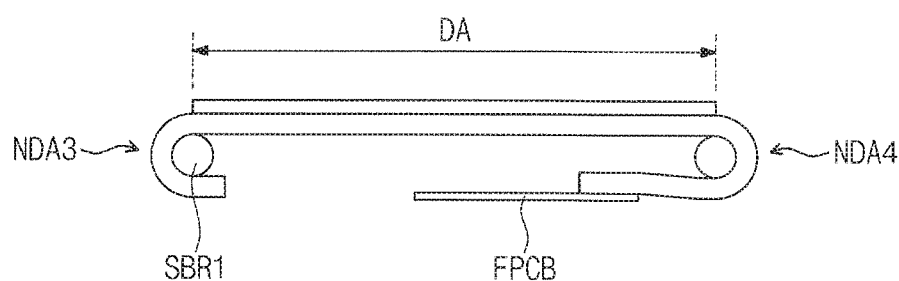
FIGS. 6A and 6B are cross-sectional views showing a flexible display panel according to another exemplary embodiment of the present disclosure.
Figure 6B:
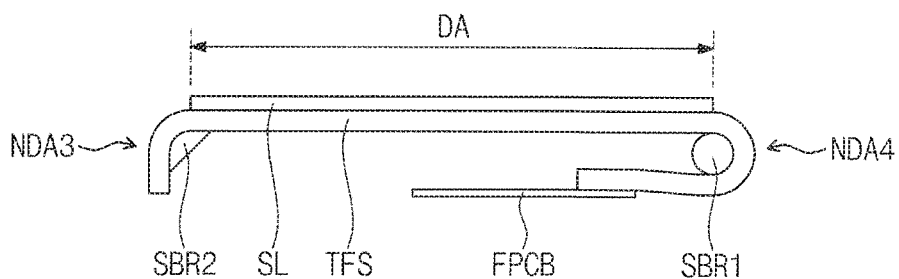

FIGS. 6A and 6B are cross-sectional views showing a flexible display panel according to another exemplary embodiment of the present disclosure. In FIGS. 6A and 6B, the same reference numerals denote the same elements in FIGS. 1 to 5C, and thus detailed descriptions of the same elements will be omitted.

Referring to FIG. 6A, the third non-display area NDA3 and the fourth non-display area NDA4 of the flexible display panel are bent. Therefore, at least two supporting members, e.g., two first supporting members SBR1, are included in the flexible display panel and respectively disposed at one end of the third non-display area NDA3 and one end of the fourth non-display area NDA4. Thus, the third non-display area NDA3 and the fourth non-display area NDA4 may be bent symmetrical to each other.

As shown in FIG. 6B, a first supporting member SBR1 and a second supporting member SBR2, which have different shapes from each other, may be respectively disposed at the one end of the fourth non-display area NDA4 and the one end of the third non-display area NDA3. Accordingly, the third non-display area NDA3 and the fourth non-display area NDA4 are bent asymmetrical to each other. For instance, the flexible display panel may be bent in the fourth non-display area NDA4 in which the first supporting member SBR1 may be disposed, and thus an angle between the flexible printed circuit board FPCB and the display area DA may be equal to or greater than about 0 degrees and smaller than about 45 degrees. In addition, the flexible display panel may be bent in the third non-display area NDA3 in which the second supporting member SBR2 may be disposed, and thus an angle between the end portion of the third non-display area NDA3 and the display area DA may be equal to or greater than about 45 degrees and smaller than about 90 degrees.

In the case that the first supporting member SBR1 and the second supporting member SBR2 are formed of the material with no elasticity, the first and supporting members SBR1 and SBR2 may securely maintain the bent state of the flexible display panel.

When the supporting member SRB1 and the second supporting member SBR2 are formed of the material with elasticity, the first and second supporting members SBR1 and SBR2 absorb external impacts applied to the bent area of the flexible display panel, and thus the flexible display panel endures the external impacts much better than that when the first and second supporting members SBR1 and SBR2 include the material having no elasticity.

When the flexible device is manufactured according to the above-mentioned structure, the curvature of the flexible display panel may be uniformly maintained. When the flexible display panel does not include the first supporting member SBR1 or the second supporting member SBR2, the curvature of the flexible display panel may be not maintained. As a result, the shape of the bent area and the curvature of the flexible display panel are changed, a crack occurs in the area in which the circuits of the flexible display panel are formed, and the flexible display panel is malfunctioned.

According to the present exemplary embodiment, since the flexible display panel includes the first and second supporting members SBR1 and SBR2, the shape of the bent area of the flexible display panel may be maintained and the flexible display panel may be prevented from being bent in unwanted areas.

In addition, when the thickness and the elasticity of the first and second supporting members SBR1 and SBR2 are adjusted, the neutral surface (not shown) in which the vector sum of the tensile force and the compressive force applied to the flexible display panel, which may be bent, becomes zero is placed on the thin film transistor substrate TFS of the flexible display panel. Thus, the circuits and the inorganic layer of the flexible display panel may be prevented from being cracked.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device, comprising:
a flexible display panel having a display area and a non-display area disposed adjacent to the display area; and
a supporting member provided at a predetermined area of the flexible display panel adjacent to one side of the flexible display panel,
wherein the supporting member contacts a rear surface of the flexible display panel, which is opposite to a front surface of the display area of the flexible display panel that is configured to display an image,
wherein a distal end portion of the flexible display panel adjacent to the non-display area surrounding the supporting member extends beyond the supporting member in a direction different from a curved surface of the supporting member,
wherein the supporting member is fixed without rotating, and
wherein a bent state of the non-display area surrounding the support member is maintained.

2. The display device of claim 1, wherein the non-display area is bent to the rear surface of the flexible display panel.

3. The display device of claim 2, wherein the non-display area comprises:
a first non-display area;
a second non-display area spaced apart from the first non-display area to face the first non-display area;
a third non-display area disposed adjacent to the first and second non-display areas; and
a fourth non-display area disposed adjacent to the first and second non-display areas and spaced apart from the third non-display area to face the third non-display area, and
the flexible display panel is bent in at least one of the first, second, third, or fourth non-display area.

4. The display device of claim 3, further comprising: a flexible printed circuit board connected to a distal end portion of the fourth non-display area.

5. The display device of claim 4, wherein the flexible display panel is bent in the fourth non-display area.

6. The display device of claim 4, wherein the flexible display panel is bent in the first non-display area and the second non-display area.

7. The display device of claim 6, wherein the first non-display area and the second non-display area are bent symmetrical to each other.

8. The display device of claim 6, wherein
the first non-display area and the second non-display area are bent asymmetrical to each other.

9. The display device of claim 4, wherein the flexible display panel is bent in the third non-display area and the fourth non-display area.

10. The display device of claim 9, wherein the third non-display area and the fourth non-display area are bent symmetrical to each other.

11. The display device of claim 9, wherein the third non-display area and the fourth non-display area are bent asymmetrical to each other.

12. The display device of claim 4, wherein the supporting member is provided at a bent area of the flexible display panel in singular number or the supporting member is provided in a plural number and the supporting members are disposed to be spaced apart from each other.

13. The display device of claim 12, wherein the supporting comprises at least one curved surface.

14. The display device of claim 12, wherein a curved surface of the flexible display panel and the at least one curved surface of the supporting make contact with each other and have a same curvature.

15. The display device of claim 1, wherein the member has a bar shape which has a cylindrical shape.

16. The display device of claim 1, wherein the supporting member has a segment of a circle shape in a cross section.

17. The display device of claim 1, wherein the supporting member comprises a material with plasticity.

18. The display device of claim 17, further comprising an adhesive disposed between the supporting member and the flexible display panel.

19. The display device of claim 14, wherein the supporting member comprises a material with elasticity.

20. The display device of claim 19, further comprising:
an adhesive disposed between the supporting member and the flexible display panel.

* * * * *